Patented Sept. 28, 1926.

1,601,232

UNITED STATES PATENT OFFICE.

HENRY BLUMENBERG, JR., OF MOAPA, NEVADA, ASSIGNOR TO STOCKHOLDERS SYNDICATE, OF LOS ANGELES, CALIFORNIA, A CORPORATION OF CALIFORNIA.

FLUX FOR ENAMEL COMPOSITIONS.

No Drawing.  Application filed October 29, 1924.  Serial No. 746,680.

My invention relates to a flux for enamel, glass or ceramic compounds.

It is an object of this invention to provide a flux for enamel, glass or ceramic compounds which is elastic, brilliant, acid and alkali resistant, and superior to the metal oxide fluxes commonly used.

My invention consists in the composition hereinafter described and claimed.

To the ordinary metal oxides such as are used in glass, enamel or ceramic ware, I add a double salt of boric acid and phosphoric acid with an alkali metal base, having a chemical composition as follows:

$$Na_2B_4O_7PO_4.$$

This sodium boron phosphate is produced by adding phosphoric acid to a sodium borate or boric acid to sodium phosphate.

In place of the sodium base potassium or lithium may be substiututed.

An example of a flux is given herewith:

| | Per cent. |
|---|---|
| Feldspar | 40 |
| $Na_2B_4O_7PO_4$  | 30 |
| Tin phosphate | 8 |
| Lead phosphate | 12 |
| Sodium carbonate | 6 |
| Sodium nitrate | 4 |

An alkali metal boron phosphate of the present invention combines with the bases of the flux at an extremely low temperature around 600 to 700° C. which is several hundred degrees lower than the temperature required in the case of the ordinary fluxes, thereby not only effecting economy in fuel but also a more uniform composition of the enamel or other ceramic composition after fusion.

I claim:

1. A flux for enamel, glass or ceramic compound containing alkali metal boron phosphate.

2. A flux for enamel, glass or ceramic compound containing sodium boron phosphate.

In testimony whereof I have signed my name to this specification.

HENRY BLUMENBERG, JR.